United States Patent
Lee et al.

(10) Patent No.: US 7,903,753 B2
(45) Date of Patent: Mar. 8, 2011

(54) STRUCTURED SPACE-TIME CODE ACHIEVING THE FULL DIVERSITY AND FULL RATE AND GENERATING METHOD THEREOF, AND MULTI-INPUT MULTI-OUTPUT SYSTEM

(75) Inventors: Seung-Joon Lee, Daejoen (KR); Choong-Il Yeh, Daejoen (KR); Dong-Seung Kwon, Daejeon (KR); Seung-Ku Hwang, Seoul (KR); Hyoung-Soo Lim, Daejeon (KR); In-Kyeong Choi, Daejoen (KR); Jong-Ee Oh, Daejeon (KR); Kwang-Jae Lim, Daejeon (KR); Seong-Rag Kim, Daejeon (KR); Young-Seog Song, Daejeon (KR); Yu-Ro Lee, Daejoen (KR); Seong-Keun Oh, Suwon-si (KR); Moon-Il Lee, Yongin-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 676 days.

(21) Appl. No.: 11/574,725

(22) PCT Filed: Feb. 28, 2005

(86) PCT No.: PCT/KR2005/000558
§ 371 (c)(1),
(2), (4) Date: Jan. 9, 2008

(87) PCT Pub. No.: WO2006/025635
PCT Pub. Date: Mar. 9, 2006

(65) Prior Publication Data
US 2008/0225975 A1    Sep. 18, 2008

(30) Foreign Application Priority Data
Sep. 3, 2004    (KR) .................. 10-2004-0070348

(51) Int. Cl.
*H04B 7/02* (2006.01)

(52) U.S. Cl. ......... 375/267; 375/260; 375/299; 375/347; 455/101; 455/132; 455/296; 455/500; 370/334

(58) Field of Classification Search .................. 375/260, 375/267, 299, 347; 455/101, 132, 296, 500, 455/562.1; 370/334
See application file for complete search history.

(56) References Cited

U.S. PATENT DOCUMENTS
6,088,408 A * 7/2000 Calderbank et al. .......... 375/347
(Continued)

FOREIGN PATENT DOCUMENTS
KR    1020020060860 A    7/2002

OTHER PUBLICATIONS

Seong Keun Oh et al., "An Enhanced MIMO Transmission Scheme for OFDMA Systems,"pp. 0-5, IEEE C80216e-04_251r3, IEEE 802.16 Broadband Wireless Access Working Group <http://ieee802.org/16>, 2004.
Siavash M. Alamouti, "A Simple Transmit Diversity Technique for Wireless Communications," IEEE Journal on Select Areas In Communication, Oct. 1998, pp. 1451-1458, vol. 16, No. 8.

(Continued)

*Primary Examiner* — David C Payne
*Assistant Examiner* — Leon Flores

(57) ABSTRACT

A space-time code used for a transmitter to transmit a plurality of data symbols to a receiver in a MIMO system, the space-time code including a code word matrix for transmitting an amount of data symbols corresponding to a product of the number of transmit antennas and a spatial multiplexing rate during one block period, wherein a row index indicates combined signals transmitted through different transmit antennas and a column index indicates time slots that correspond to the number of transmit antennas, and wherein the number of data symbols allocated to each transmit antenna in a code block corresponds to the spatial multiplexing rate, and the data symbols are combined by different combining coefficients for each transmit antenna at every time slot, and simultaneously transmitted through different transmit antennas, and each transmit antenna transmits a different set of data symbols at every time slot.

14 Claims, 6 Drawing Sheets

U.S. PATENT DOCUMENTS

| | | | |
|---|---|---|---|
| 7,436,896 B2 * | 10/2008 | Hottinen et al. | 375/267 |
| 7,505,527 B2 * | 3/2009 | Hwang et al. | 375/267 |
| 2003/0002450 A1 | 1/2003 | Jalali et al. | |
| 2003/0125040 A1 | 7/2003 | Walton et al. | |
| 2004/0002364 A1 * | 1/2004 | Trikkonen et al. | 455/562.1 |
| 2004/0082303 A1 | 4/2004 | Giannakis et al. | |
| 2005/0105631 A1 * | 5/2005 | Giannakis et al. | 375/267 |
| 2006/0045201 A1 | 3/2006 | Chae et al. | |

OTHER PUBLICATIONS

G.D. Golden et al., "Detection algorithm and initial laboratory results using V-BLAST space-time communication architecture," Electronics Letters, Jan. 7, 1999, pp. 14-16, vol. 35, No. 1.

Huan Yao et al. "Structured Space-Time Block Codes With Optimal Diversity-Multiplexing Tradeoff and Minimum Delay," GLOBECOM 2003, pp. 1941-1945.

* cited by examiner

STRUCTURED SPACE-TIME CODE ACHIEVING THE FULL DIVERSITY AND FULL RATE AND GENERATING METHOD THEREOF, AND MULTI-INPUT MULTI-OUTPUT SYSTEM

TECHNICAL FIELD

The present invention relates to a multi-input multi-output (MIMO) system, and particularly to a structured space-time code designed to simultaneously achieve full diversity even under full spatial multiplexing rate by using multiples antennas at both the transmitter and receiver sides, and a method for generating the same, and a MIMO system capable of enhancing reliability and/or increasing the transmission capacity by using the space-time code in a wireless communication environment.

BACKGROUND ART

Recently, the generalization of telecommunication services, and the emergence of various multimedia and high-quality services have resulted in the increase of demands to communication services. To actively copy with these trends, the capacity of a communication system should be increased in a wireless communication environment rather than in a wired communication environment. This is because in the wireless environment, available frequency spectrum is extremely limited and should be shared, and the need for wireless communication services gets increasing fastly by its inherent unthetheredness.

The capacity of wireless communication systems can be increased by allocating a greater bandwidth and enhancing the efficiency of a given radio resource.

Various methods to increase the efficiency of the given radio resource have been developed, Among them, a space-time coding method has attracted considerable attention in the wireless communication environment since it can improve the reliability of data transmission in a wireless communication system by using additionally the spatial dimension for resource utilization without bandwidth expansion and/or increase transmission capacity through parallel transmission using spatial multiplexing.

In a like manner, transmission capacity of wireless communication systems may be remarkably increased by employing MIMO techniques.

A space-time block coding method proposed by Alamouti (entitled "A simple transmit diversity technique for wireless communications", IEEE JSAC, vol. 16, no. 8, October 1998) is a representative transmit diversity technique that overcomes multipath fading over wireless channels by using multiple antennas both at the transmitter and receiver. The above space-time block coding method uses only two transmit antennas and can achieve the full diversity by providing the diversity order corresponding to a product of the number of transmit antennas and the number of receive antennas. However, the above methods can transmit only two data symbols during two time slots through two transmit antennas, thus resulting in a transmission rate of 1, and no spatial multiplexing gain is achieved irrespective of the number of receive antennas. Furthermore, this method cannot be applied to the case of more than three transmit antennas.

Bell Lab's V-BLAST (Vertical Bell Laboratories Layered Space-Time) system (entitled "Detection algorithm and initial laboratory results using V-BLAST space-time communication architecture", IEEE, Vol. 35, No. 1, pp. 14-16, 1999) is a representative method for achieving a spatial multiplexing gain. In the V-BLAST system, each transmit antenna transmits a different signal with the same transmission power and data rate, and a receiver performs the three consecutive processes of detection ordering, interference nulling, and interference cancellation to remove undesired interference signals, thereby to increase a signal-to-noise ratio (SNR) when the receiver detects the transmitted signal. In the V-BLAST system, the full spatial multiplexing gain is maintained since independent data signals corresponding to the number of transmit antennas can be simultaneously transmitted if the number of transmit antennas is equal to or greater than the number of receive antennas. However, this method requires the number of receive antennas to be equal to or greater than the number of transmit antennas and achieves the full multiplexing gain with no diversity gain. Moreover, once a data symbol is restored with error, the erroneous data is propagated to the following signal detection processes thereby resulting in severe performance degradation.

Meanwhile, a tilted Quadrature Amplitude Modulation (QAM) code proposed by Yao and Wornell (entitled "Structured space-time block codes with optimal diversity-multiplexing tradeoff and minimum delay," Globecom, pp. 1941-1945, 2003) is a space-time code for providing full diversity and full rate (FDFR) that achieves an optimal diversity-multiplexing tradeoff proposed by Zhang and Tse. The tilted QAM code is a short space-time block code with code length of two for a system with two transmit antennas and two receive antennas, and the rotation of QAM constellations is used to obtain the full diversity gain while preserving the full multiplexing gain. However, this algorithm cannot obtain a full coding gain because it uses simple rotation of a signal, and may be exploited only with a two transmit antenna and two receive antenna system. The information disclosed in this Background of the Invention section is only for enhancement of understanding of the background of the invention, and therefore, unless explicitly described to the contrary, it should not be taken as an acknowledgement or any form of suggestion that this information forms the prior art that is already known in this country to a person of ordinary skill in the art.

DISCLOSURE

Technical Problem

The present invention has been made in an effort to provide a structured space-time code and a method for generating the structured space-time code, and a multi-input multi-output system having advantages of achieving full diversity and full rate (FDFR) transmissions using the space-time code.

Technical Solution

In one aspect of the present invention, a space-time code is used for a transmitter to transmit a plurality of data symbols from a transmitter to a receiver in a multi-input multi-output (MIMO) system having multiple transmit antennas and multiple receive antennas. The space-time code includes a square code word matrix for transmitting an amount of data symbols corresponding to a product of the number of transmit antennas and a spatial multiplexing rate during one code block period, a row index of the code word matrix indicating combined signals transmitted through different transmit antennas and a column index of the code word matrix indicating time slots.

In a code block, an average number of data symbols allocated to each transmit antenna at every time slot is equal to the spatial multiplexing rate and at every time slot, the data symbols allocated for each transmit antenna are combined together and simultaneously transmitted through the corresponding transmit antenna, and each transmit antenna transmits a different set of data symbols from a time slot to another.

In addition, when setting a code word matrix to transmit a plurality of data symbols that correspond to a product of the number of transmit antennas and the spatial multiplexing rate during one code block period, every data symbols to be transmitted in the code block period is allocated at least once to all transmit antennas.

When the average number of data symbols that corresponds to the spatial multiplexing rate is allocated to each transmit antenna at every time slot of the code word matrix, different sets of data symbols are allocated to the respective transmit antennas for transmission.

When the data symbols allocated to each transmit antenna are combined together and simultaneously transmitted through the corresponding transmit antenna, the data symbols allocated to each transmit antenna are combined together with a set of combining coefficients from a transmit antenna to another.

In addition, the code word matrix is determined to control the time slot when allocating a set of data symbols to each transmit antenna, the data symbols are controlled to be rotationally moved from one transmit antenna to another and allocated to an adjacent transmit antenna.

In another aspect of the present invention, a method for generating a space-time code used for transmitting a plurality of data symbols from a transmitting unit of a multi-input multi-output (MIMO) system to a receiver is provided. The method includes a) setting columns and rows of a codeword matrix determining the space-time code to match with the number of antennas at the transmitting unit, the row corresponding to the number of antennas of the receiving unit and the column corresponding to the number of time slots for one code block period; b) determining an average number of data symbols to be transmitted during the code block period by a product of the number of antennas at the transmitting side and a spatial multiplexing rate; c) selecting a given row in the code word matrix, and allocating the average number of data symbols that corresponds to the spatial multiplexing rate among the data symbols determined in b); d) allocating a combining coefficient corresponding to the average number of data symbols allocated in c) to each data symbol and combining each by using the combining coefficient; and e) iteratively performing c) and d) on other rows, excluding the row selected in c) and d) while allocating different data symbols in the respective rows and columns of the code word matrix and, at the same time, allocating a different combining coefficient to each symbol allocated to the respective rows.

In e), when allocating a data symbol to each column of a row that is adjacent to the selected row, data symbols allocated to columns of the selected row are controlled to be rotationally moved with respect to the selected row and allocated to the adjacent row.

In addition, after e), the method further includes selecting combining coefficients allocated to the respective symbols to equalize mean powers of the data symbols allocated to the respective columns of the selected row of the code word matrix, average transmit power of the selected row, or average transmit power allocated to the respective data symbols.

In another aspect of the present invention, a multi-input multi-output (MIMO) system includes a transmitting unit and a receiving unit. The transmitting unit generates space-time codes for data symbols that correspond to a product of the number of transmit antennas and a spatial multiplexing rate within one code block period, and transmits the space-time codes through a plurality of transmit antennas. The receiving unit receives signals transmitted to the transmitting unit using a plurality of receive antennas, decodes the signals, and restoring data symbols corresponding to the signals. The space-time codes are formed in a code word matrix that corresponding to the number of the transmit antennas, rows of the code matrix indicating time slots that correspond to the number of transmit antennas and columns of the codeword matrix representing the number of time slots corresponding to the number of receive antennas. In the codeword matrix, an average number of data symbols allocated to the respective receive antennas for transmission corresponds to the spatial multiplexing rate. The data symbols are combined together by different combining coefficients, respectively, and synchronously transmitted to the corresponding transmit antenna, and the respective antennas in each time slot are allocated with different sets of data symbols.

Advantageous Effects

Accordingly, the present invention is proposed to provide a space-time code and a method of generating the same, and a multi-input multi-output (MIMO) system using the space-time code. The space-time code has a minimum delay while simultaneously achieving the full diversity gain and the full multiplexing gain, and the multi-input multi-output (MIMO) system transmits simultaneously data symbols through a plurality of transmit antennas by using the space-time code.

BEST MODE

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. A method for generating a structured space-time code for the full diversity gain and the full multiplexing gain according to an embodiment of the present invention will hereinafter be described with reference to the accompanying drawings.

Figure 1:
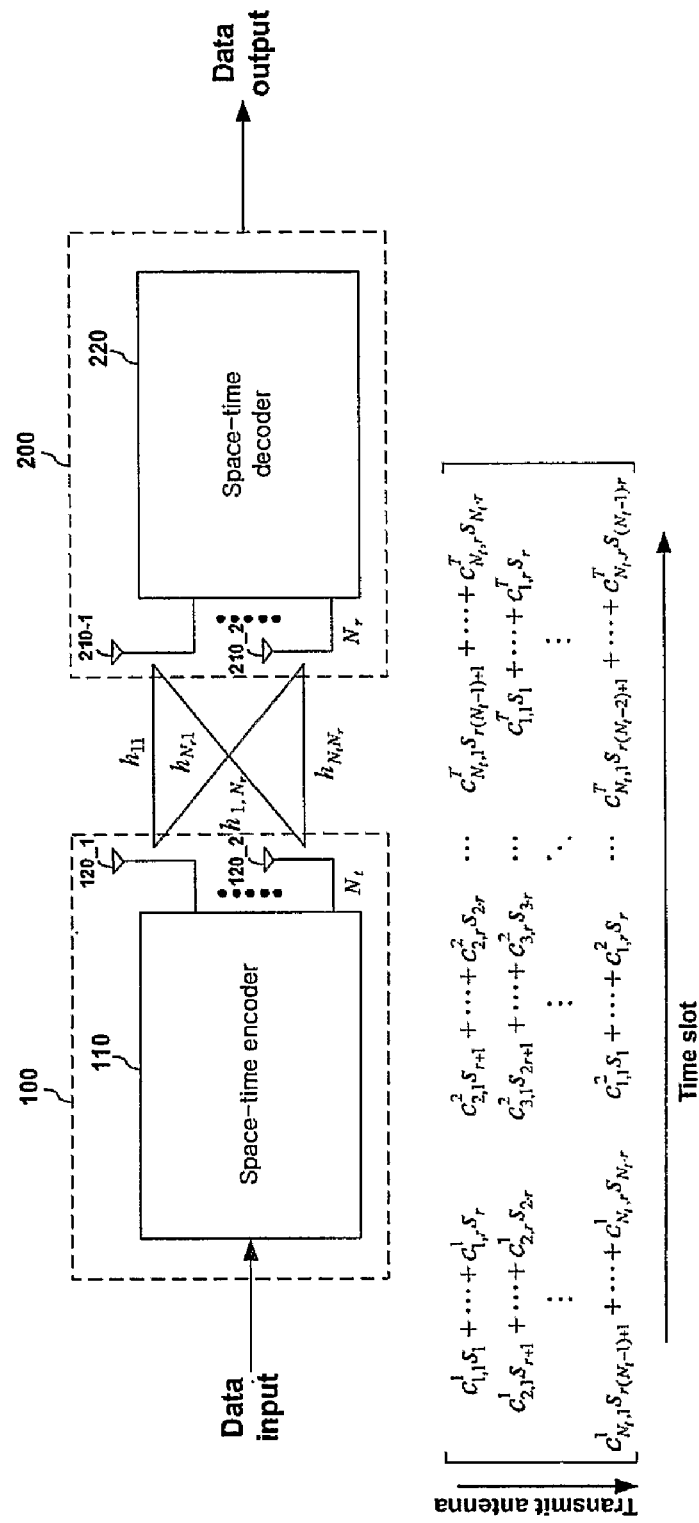
FIG. 1 is a block diagram of a MIMO system that uses a structured space-time code to obtain the full diversity gain and the full multiplexing gain according to an embodiment of the present invention.

FIG. 1 is a block diagram of a MIMO system that employs structured space-time coding designed for achieving the full diversity gain and the full multiplexing gain according to an embodiment of the present invention.

As shown in FIG. 1, the MIMO system includes a transmitter 100 that encodes input data symbols according to the structured space-time code and transmits the encoded data input through $N_t$ transmit antennas, and a receiver 200 that receives signals through $N_r$ receive antennas and decodes the signals by using some decoding rule based on the structured time-space code.

The transmitter 100 includes a space-time encoder 110 and a plurality of transmit antennas $120\_1$-$120\_N_t$.

The space-time encoder 110 generates encoded symbols using the proposed space-time code (to be described later) from input data symbols, and transmits the space-time coded symbols to the receiver 200 through a plurality of transmit antennas $120\_1$-$120\_N_t$.

The receiver 200 includes a plurality of receive antennas $210\_1$-$210\_N_r$ and a space-time decoder 220.

The space-time decoder 220 restores the data symbol transmitted from the transmitter 100 by decoding signals received through the plurality of receive antennas $210\_1$-$210\_N_r$ using some decoding rule based on the space-time code.

The space-time encoder 110 of the transmitter 100 and the space-time decoder 220 of the receiver 200 respectively encode data symbols and decode the received signals using some decoding rule based on the space-time code according to the embodiment of the present invention. Throughout the specification, a structure of the space-time code and an encoding algorithm will be described, but a decoding algorithm will not be further described since it is well-known to those skilled in the art.

A space-time code is a block code that is defined by a square matrix corresponding to a product of the number of transmit antennas and the number of time slots for a code block. Rows of the matrix indicate combined signals respectively transmitted through different transmit antennas and columns of the matrix indicate time slots indicates the time slots according to an embodiment of the present invention.

When the number of transmit antennas is set to be $N_t$, the number of receive antennas is set to be $N_r$, and a spatial multiplexing rate is set to be r, the combined signal that is actually transmitted through $N_t$ transmit antennas during $N_t$ time slots may be defined by [Math Figure 1]. Herein, basically $\min(N_t, N_r)$ should be set to be equal to or greater than r to obtain the spatial multiplexing rate r, and the signals transmitted through the corresponding transmit antennas at every time slot are determined by combining all data symbols transmitted in a code block period with different sets of complex weights.

$$y_1 = c_{1,1}s_1 + c_{1,2}s_2 + \ldots + c_{1,N_t \cdot r}s_{N_t \cdot r}$$ [Math Figure 1]
$$y_2 = c_{2,1}s_1 + c_{2,2}s_2 + \ldots + c_{2,N_t \cdot r}s_{N_t \cdot r}$$
$$\vdots$$
$$y_{N_t \cdot N_t} = c_{N_t \cdot N_t,1}s_1 + c_{N_t \cdot N_t,2}s_2 + \ldots + c_{N_t \cdot N_t, N_t \cdot r}s_{N_t \cdot r}$$

$$\begin{pmatrix} y_1 \\ y_2 \\ \vdots \\ y_{N_t \cdot N_t} \end{pmatrix} = \begin{pmatrix} c_{1,1} & c_{1,2} & \cdots & c_{1,N_t \cdot r} \\ c_{2,1} & c_{2,2} & \cdots & c_{2,N_t \cdot r} \\ \vdots & \vdots & \ddots & \vdots \\ c_{N_t \cdot N_t,1} & c_{N_t \cdot N_t,2} & \cdots & c_{N_t \cdot N_t,N_t \cdot r} \end{pmatrix} \begin{pmatrix} s_1 \\ s_2 \\ \vdots \\ s_{N_t \cdot r} \end{pmatrix}$$

where $S_n$ is an n-th data symbol, and $y_m$ is a combined signal actually transmitted through the transmit antenna. Herein, $c_{i,j}$ is a combining coefficient given as a complex number.

Figure 2:
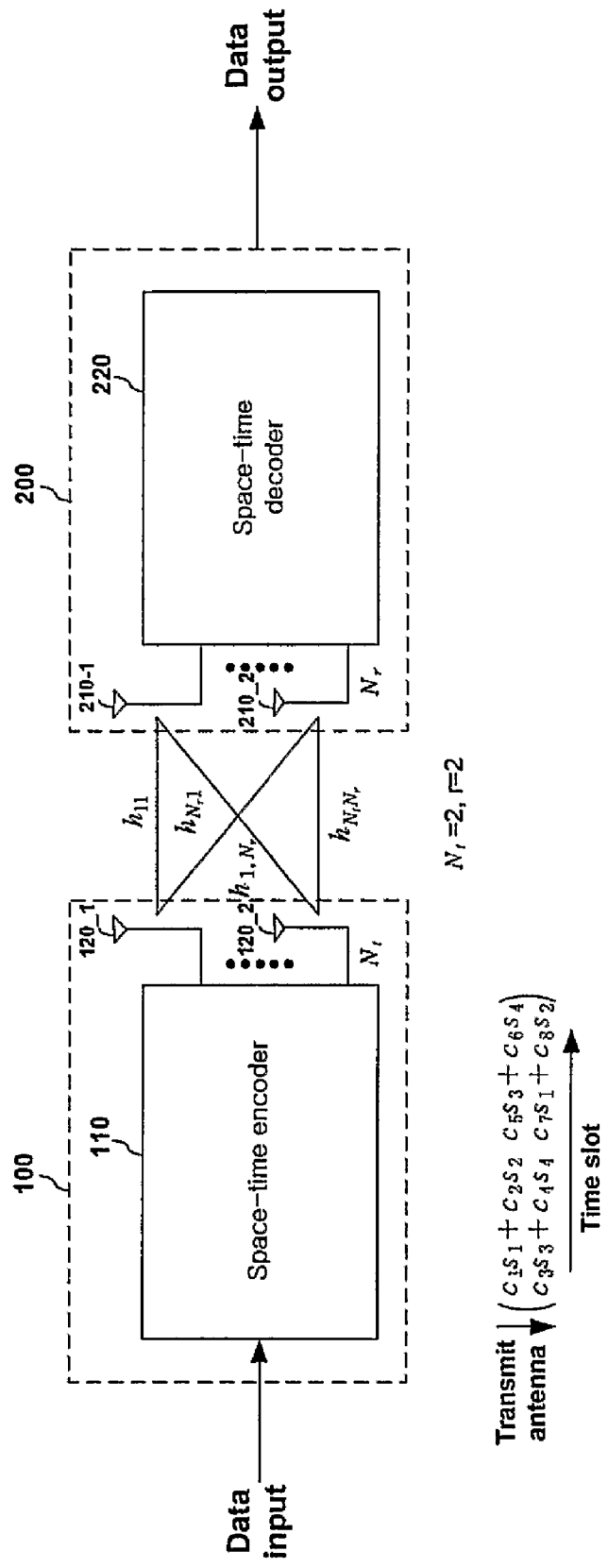
FIG. 2 exemplarily illustrates an example of a space-time codeword matrix in the MIMO system with two transmit antennas and the spatial multiplexing rate 2 of FIG. 1.

A space-time codeword matrix C can be defined by [Math Figure 2].

$$C = \begin{pmatrix} y_1 & y_{N_t+1} & \cdots & y_{N_t(N_t-1)+1} \\ y_2 & y_{N_t+2} & \cdots & y_{N_t(N_t-1)+2} \\ \vdots & \vdots & \ddots & \vdots \\ y_{N_t} & y_{N_t \cdot 2} & \cdots & y_{N_t \cdot N_t} \end{pmatrix}$$ [Math Figure 2]

The number of rows in matrix C set to be equal to the number of transmit antennas $N_t$, for minimum delay.

The space-time code is designed to simultaneously transmit $N_t \times r$ data symbols during one code block period. Thus, the number of data symbols corresponding to the spatial multiplexing rate γ is allocated to each transmit antenna at a time slot within the code block period. The data symbols allocated to each antenna are combined with different complex weights and simultaneously transmitted.

The same set of data symbols corresponding to the spatial multiplexing rate r is repeated at every time slot in the code block period, but transmitted through different transmit antennas with different sets of complex weights.

When allocating the data symbols to each transmit antennas, a random data symbol is allocated only once to a specific transmit antenna, and is allocated to each transmit antenna at least once to all transmit antennas during one code block period according to an embodiment of the present invention.

A set of data symbols allocated to each transmit antenna may be variously formatted at every time slot, and the data symbols are transmitted through the corresponding transmit antenna with a different set of complex weights at every time slot. A combining coefficient $C_{i,j}$ that combines data symbols of the respective rows is preferably set to be "0," excluding r number of combining coefficients allocated to each transmit antennas. Further, it is preferred to set a value of the combining coefficient $C_{i,j}$ to be appropriate such that each data symbol is transmitted at least once and only once through all transmit antennas during one code block period when allocating data symbols per antenna at every time slot during the code block period.

Figure 3:
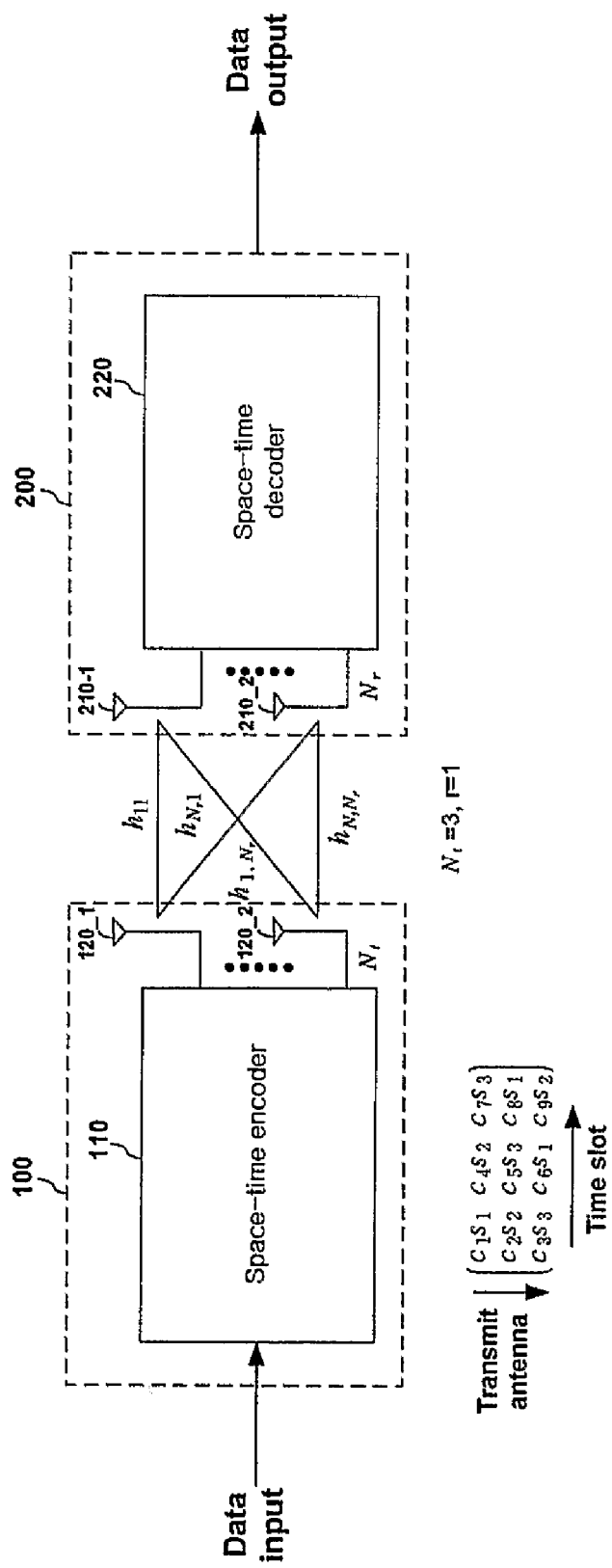
FIG. 3 exemplarily illustrates an example of a space-time codeword matrix in the MIMO system with three transmit antennas and the spatial multiplexing rate 1 of FIG. 1.

For simplicity in concept and design as shown in [Math Figure 3], sets of data symbols allocated to each transmit antenna at every time slot are rotationally shifted by one transmit antenna to another and allocated to adjacent antennas, respectively. The data symbols allocated to the adjacent antennas are combined together with different complex weights and then transmitted.

$$C =$$

[Math Figure 3]

$$\begin{bmatrix} c_{1,1}^1 s_1 + \ldots + c_{1,r}^1 s_r & c_{2,1}^2 s_{r+1} + \ldots + c_{2,r}^2 s_{2 \cdot r} & \cdots & c_{N_t,1}^T s_{r(N_t-1)+1} + \ldots + c_{N_t,r}^T s_{N_t \cdot r} \\ c_{2,1}^1 s_{r+1} + \ldots + c_{2,r}^1 s_{2 \cdot r} & c_{3,1}^2 s_{2r+1} + \ldots + c_{3,r}^2 s_{3 \cdot r} & \cdots & c_{1,1}^T s_1 + \ldots + c_{1,r}^T s_r \\ \vdots & \vdots & \ddots & \vdots \\ c_{N_t,1}^1 s_{r(N_t-1)+1} + \ldots + c_{N_t,r}^1 s_{N_t \cdot r} & c_{1,1}^2 s_1 + \ldots + c_{1,r}^2 s_r & \cdots & c_{N_t,1}^T s_{r(N_t-2)+1} + \ldots + c_{N_t,r}^T s_{(N_t-1) \cdot r} \end{bmatrix}$$

In [Math Figure 3], a combining coefficient $c_{i,j}^t$ denotes a complex weight for combining a j-th data symbol transmitted through an i-th antenna at a t-th time slot. The definition of a complex weight will hereinafter be varied for simple description as necessary.

Figure 4:
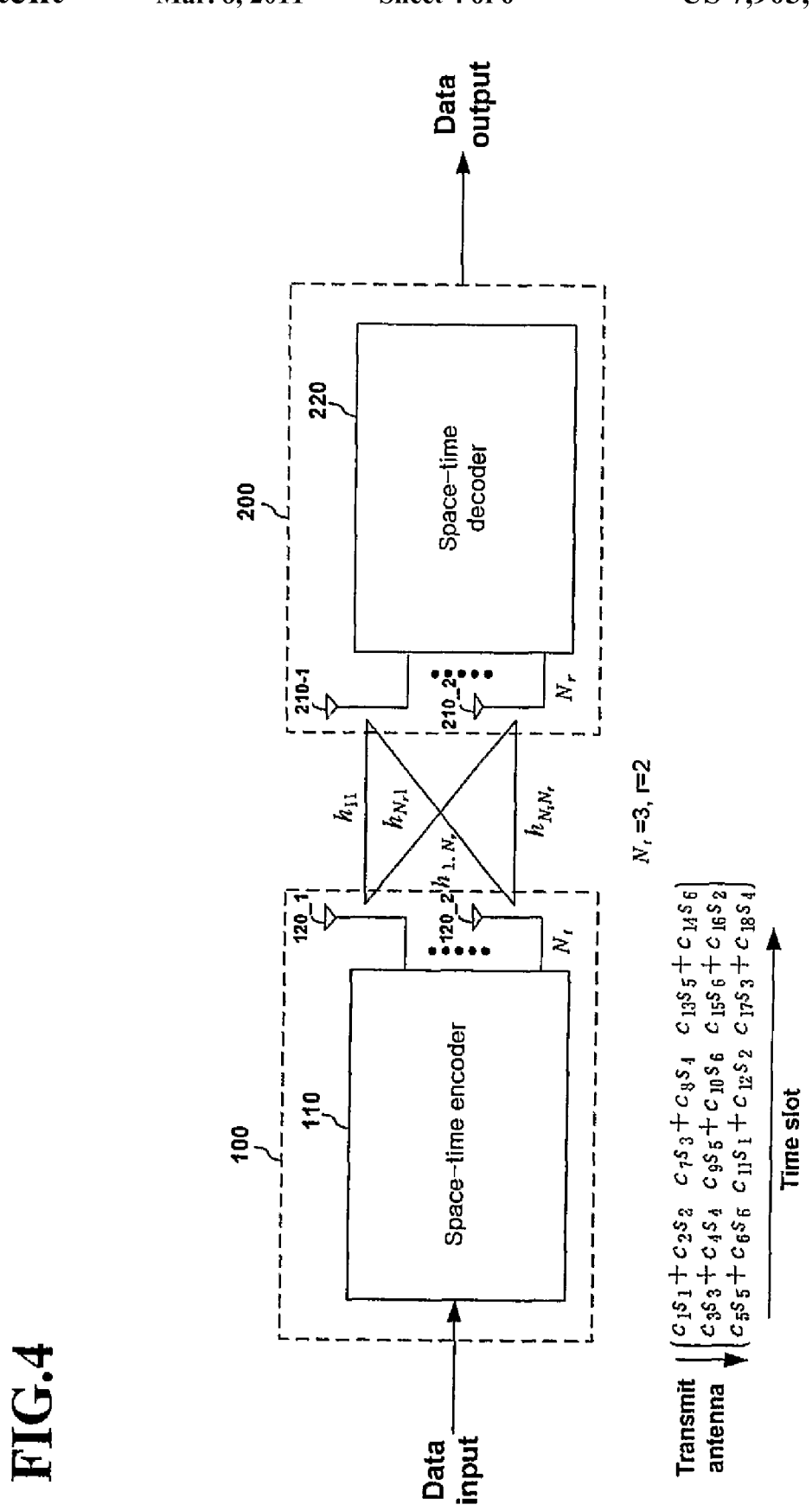
FIG. 4 exemplarily illustrates an example of a space-time codeword matrix in the MIMO system with three transmit antennas and the spatial multiplexing rate 2 of FIG. 1.

According to a first exemplarily embodiment of the present invention, if $N_t=2$ and $r=2$, a space-time codeword is realized as a combination of data symbols defined by [Math Figure 4].

$$y_1 = c_1 s_1 + c_2 s_2,$$ [Math Figure 4]

$$y_3 = c_5 s_3 + c_6 s_4$$

$$y_2 = c_3 s_3 + c_4 s_4,$$

$$y_4 = c_7 s_1 + c_8 s_2$$

$$\begin{pmatrix} y_1 \\ y_2 \\ y_3 \\ y_4 \end{pmatrix} = \begin{pmatrix} c_1 & c_2 & 0 & 0 \\ 0 & 0 & c_3 & c_4 \\ 0 & 0 & c_5 & c_6 \\ c_7 & c_8 & 0 & 0 \end{pmatrix} \begin{pmatrix} s_1 \\ s_2 \\ s_3 \\ s_4 \end{pmatrix}$$

In [Math Figure 4], a code matrix may be variously formatted depending on a combination of data symbols for the corresponding transmit antenna. However, a basic concept is that at one time slot, two data symbols in each transmit antenna are combined together with complex weights and transmitted, and during the other time slot, a different set of data symbols is allocated to the corresponding transmit antenna.

Figure 5:
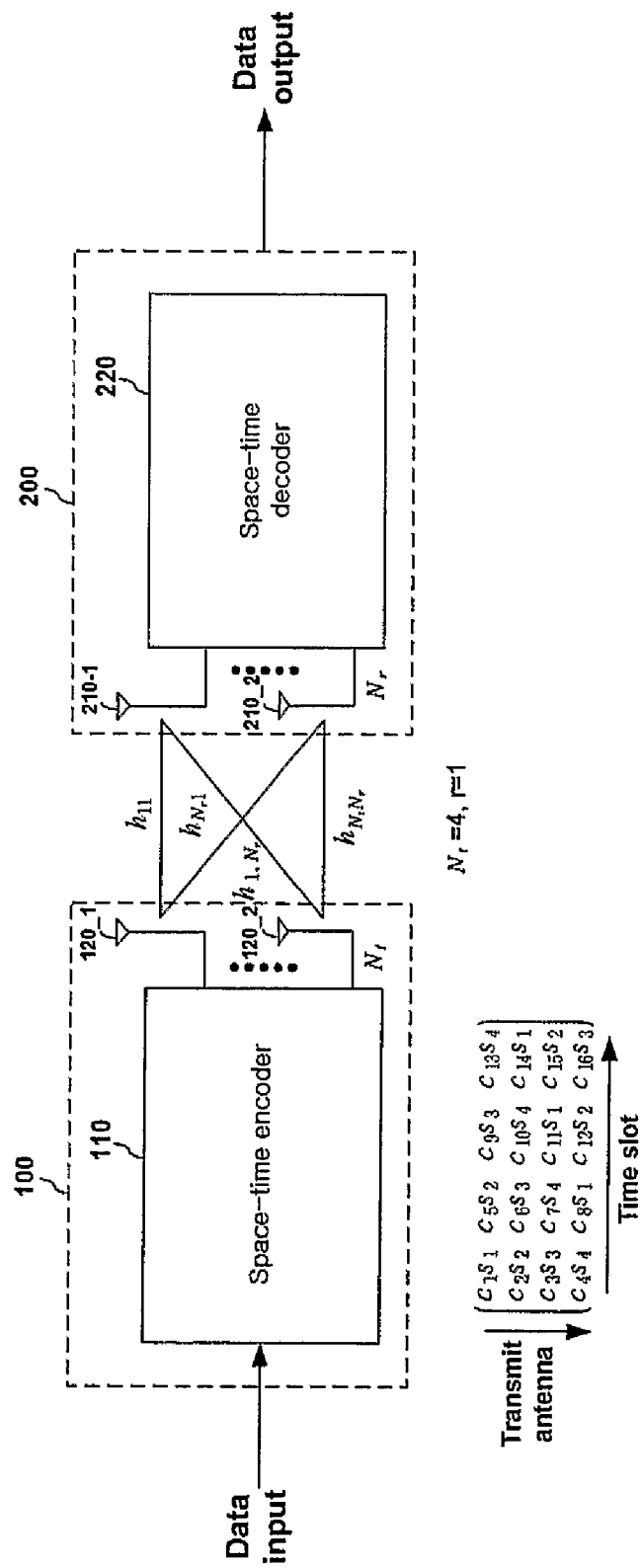
FIG. 5 exemplarily illustrates an example of a space-time codeword matrix in the MIMO system with four transmit antennas and the spatial multiplexing rate 1 of FIG. 1.

The space-time code of [Math Figure 4] may be realized as a space-time codeword matrix C of [Math Figure 5], and a MIMO system that uses such a codeword matrix is shown in FIG. 2.

$$C = \begin{pmatrix} y_1 & y_3 \\ y_2 & y_4 \end{pmatrix} = \begin{pmatrix} c_1 s_1 + c_2 s_2 & c_5 s_3 + c_6 s_4 \\ c_3 s_3 + c_4 s_4 & c_7 s_1 + c_8 s_2 \end{pmatrix}$$ [Math Figure 5]

Figure 6:
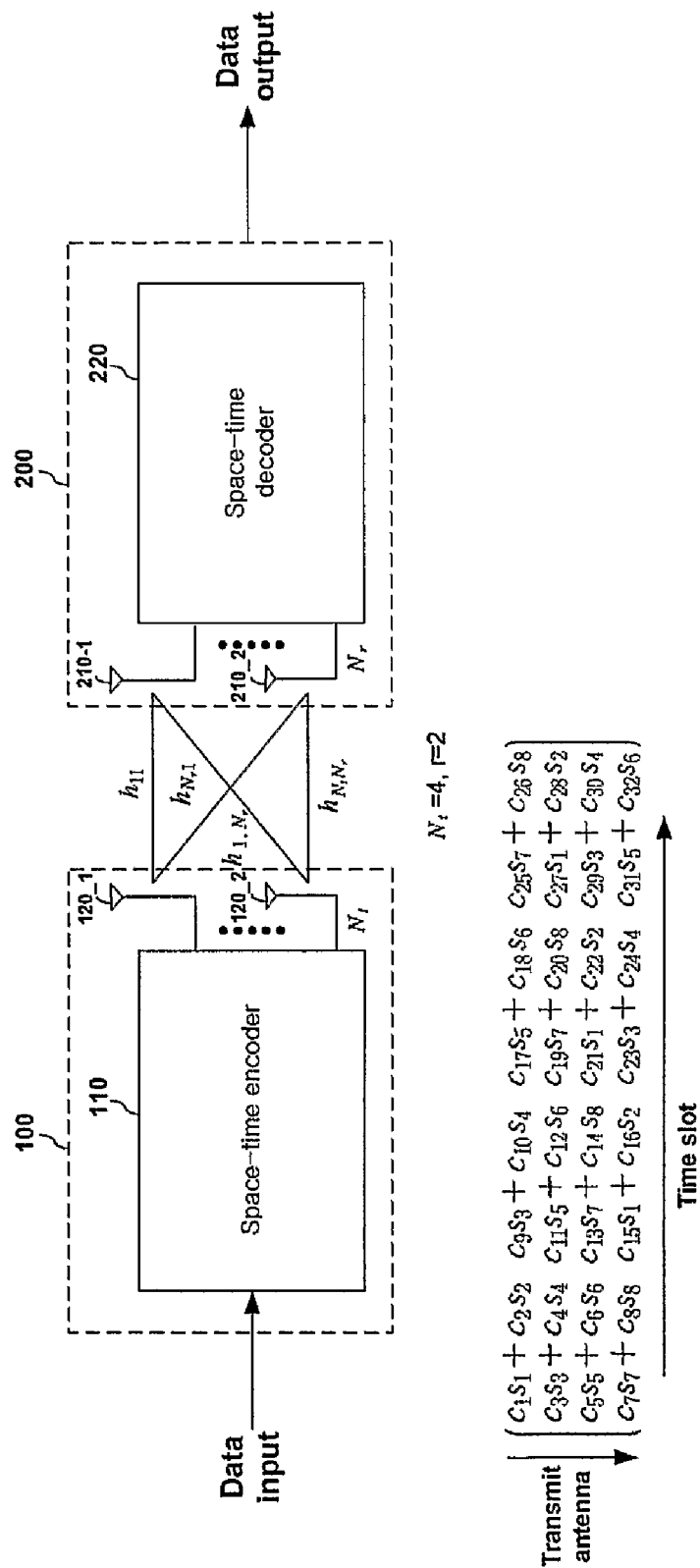
FIG. 6 exemplarily illustrates an example of a space-time codeword matrix in the MIMO system with four transmit antennas and the spatial multiplexing rate 2 of FIG. 1.

According to a second exemplarily embodiment of the present invention, if $N_t=3$ and $r=1$, a space-time codeword is realized as a combination of data symbols defined by [Math Figure 6].

$$y_1 = c_1 s_1,$$ [Math Figure 6]

$$y_4 = c_4 s_2,$$

$$y_7 = c_7 s_3,$$

$$y_2 = c_2 s_2,$$

$$y_5 = c_5 s_3,$$

$$y_8 = c_8 s_1,$$

$$y_3 = c_3 s_3,$$

$$y_6 = c_6 s_1,$$

$$y_9 = c_9 s_2.$$

$$\begin{pmatrix} y_1 \\ y_2 \\ y_3 \\ y_4 \\ y_5 \\ y_6 \\ y_7 \\ y_8 \\ y_9 \end{pmatrix} = \begin{pmatrix} c_1 & 0 & 0 \\ 0 & c_2 & 0 \\ 0 & 0 & c_3 \\ 0 & c_4 & 0 \\ 0 & 0 & c_5 \\ c_6 & 0 & 0 \\ 0 & 0 & c_7 \\ c_8 & 0 & 0 \\ 0 & c_9 & 0 \end{pmatrix} \begin{pmatrix} s_1 \\ s_2 \\ s_3 \end{pmatrix}$$

In [Math Figure 6], a code matrix may be variously formatted depending on a combination of signals for the corresponding antenna, and a space-time code of [Math Figure 6] may be realized as a codeword matrix C of [Math Figure 7]. FIG. 3 shows a MIMO system that uses such a codeword matrix.

$$C = \begin{pmatrix} y_1 & y_4 & y_7 \\ y_2 & y_5 & y_8 \\ y_3 & y_6 & y_9 \end{pmatrix} = \begin{pmatrix} c_1 s_1 & c_4 s_2 & c_7 s_3 \\ c_2 s_2 & c_5 s_3 & c_8 s_1 \\ c_3 s_3 & c_6 s_1 & c_9 s_2 \end{pmatrix}$$ [Math Figure 7]

According to a third exemplarily embodiment of the present invention, if $N_t=3$ and $r=2$, a space-time codeword is realized as a combination of data symbols defined by [Math Figure 8].

$$y_1 = c_1 s_1 + c_2 s_2,$$ [Math Figure 8]

$$y_4 = c_7 s_3 + c_8 s_4,$$

$$y_7 = c_{13} s_5 + c_{14} s_6$$

$$y_2 = c_3 s_3 + c_4 s_4,$$

$$y_5 = c_9 s_5 + c_{10} s_6,$$

$$y_8 = c_{15} s_1 + c_{16} s_2$$

-continued $$y_3 = c_5 s_5 + c_6 s_6,$$
$$y_6 = c_{11} s_1 + c_{12} s_2,$$
$$y_9 = c_{17} s_3 + c_{18} s_4$$

$$\begin{pmatrix} y_1 \\ y_2 \\ y_3 \\ y_4 \\ y_5 \\ y_6 \\ y_7 \\ y_8 \\ y_9 \end{pmatrix} = \begin{pmatrix} c_1 & c_2 & 0 & 0 & 0 & 0 \\ 0 & 0 & c_3 & c_4 & 0 & 0 \\ 0 & 0 & 0 & 0 & c_5 & c_6 \\ 0 & 0 & c_7 & c_8 & 0 & 0 \\ 0 & 0 & 0 & 0 & c_9 & c_{10} \\ c_{11} & c_{12} & 0 & 0 & 0 & 0 \\ 0 & 0 & 0 & 0 & c_{13} & c_{14} \\ c_{15} & c_{16} & 0 & 0 & 0 & 0 \\ 0 & 0 & c_{17} & c_{18} & 0 & 0 \end{pmatrix} \begin{pmatrix} s_1 \\ s_2 \\ s_3 \\ s_4 \\ s_5 \\ s_6 \end{pmatrix}$$

A code matrix of [Math Figure 8] may be variously formatted depending on a combination of data symbols for the corresponding antenna, and a space-time code of [Math Figure 8] may be realized as a codeword matrix C of [Math Figure 9]. FIG. 4 shows a MIMO system that uses such a codeword matrix.

$$C = \begin{pmatrix} y_1 & y_4 & y_7 \\ y_2 & y_5 & y_8 \\ y_3 & y_6 & y_9 \end{pmatrix}$$ [Math Figure 9]

$$= \begin{pmatrix} c_1 s_1 + c_2 s_2 & c_7 s_3 + c_8 s_4 & c_{13} s_5 + c_{14} s_6 \\ c_3 s_3 + c_4 s_4 & c_9 s_5 + c_{10} s_6 & c_{15} s_1 + c_{16} s_2 \\ c_5 s_5 + c_6 s_6 & c_{11} s_1 + c_{12} s_2 & c_{17} s_3 + c_{18} s_4 \end{pmatrix}$$

According to a fourth exemplarily embodiment of the present invention, if $N_t=4$ and $r=1$, a space-time codeword is realized as a combination of data symbols defined by [Math Figure 10].

$$y_1 = c_1 s_1,$$ [Math Figure 10]
$$y_5 = c_5 s_2,$$
$$y_9 = c_9 s_3,$$
$$y_{13} = c_{13} s_4,$$
$$y_2 = c_2 s_2,$$
$$y_6 = c_6 s_3,$$
$$y_{10} = c_{10} s_4,$$
$$y_{14} = c_{14} s_1,$$
$$y_3 = c_3 s_3,$$
$$y_7 = c_7 s_4,$$
$$y_{11} = c_{11} s_1,$$
$$y_{15} = c_{15} s_2,$$
$$y_4 = c_4 s_4,$$
$$y_8 = c_8 s_1,$$
$$y_{12} = c_{12} s_2,$$
$$y_{16} = c_{16} s_3.$$

-continued $$\begin{pmatrix} y_1 \\ y_2 \\ y_3 \\ y_4 \\ y_5 \\ y_6 \\ y_7 \\ y_8 \\ y_9 \\ y_{10} \\ y_{11} \\ y_{12} \\ y_{13} \\ y_{14} \\ y_{15} \\ y_{16} \end{pmatrix} = \begin{pmatrix} c_1 & 0 & 0 & 0 \\ 0 & c_2 & 0 & 0 \\ 0 & 0 & c_3 & 0 \\ 0 & 0 & 0 & c_4 \\ 0 & c_5 & 0 & 0 \\ 0 & 0 & c_6 & 0 \\ 0 & 0 & 0 & c_7 \\ c_8 & 0 & 0 & 0 \\ 0 & 0 & c_9 & 0 \\ 0 & 0 & 0 & c_{10} \\ c_{11} & 0 & 0 & 0 \\ 0 & c_{12} & 0 & 0 \\ 0 & 0 & 0 & c_{13} \\ c_{14} & 0 & 0 & 0 \\ 0 & c_{15} & 0 & 0 \\ 0 & 0 & c_{16} & 0 \end{pmatrix} \cdot \begin{pmatrix} s_1 \\ s_2 \\ s_3 \\ s_4 \end{pmatrix}$$

A code matrix of [Math Figure 10] may be variously formatted depending on a combination of data symbols for the corresponding antenna, and a space-time code may be represented as a codeword matrix C defined by [Math Figure 11]. FIG. 5 shows a MIMO system that uses such a codeword matrix.

$$C = \begin{pmatrix} y_1 & y_5 & y_9 & y_{13} \\ y_2 & y_6 & y_{10} & y_{14} \\ y_3 & y_7 & y_{11} & y_{15} \\ y_4 & y_8 & y_{12} & y_{16} \end{pmatrix}$$ [Math Figure 11]

$$= \begin{pmatrix} c_1 s_1 & c_5 s_2 & c_9 s_3 & c_{13} s_4 \\ c_2 s_2 & c_6 s_3 & c_{10} s_4 & c_{14} s_1 \\ c_3 s_3 & c_7 s_4 & c_{11} s_1 & c_{15} s_2 \\ c_4 s_4 & c_8 s_1 & c_{12} s_2 & c_{16} s_3 \end{pmatrix}$$

According to a fifth exemplarily embodiment of the present invention, if $N_t=4$ and $r=2$, a space-time codeword is realized as a combination of data symbols defined by [Math Figure 12].

$$y_1 = c_1 s_1 + c_2 s_2,$$ [Math Figure 12]
$$y_5 = c_9 s_3 + c_{10} s_4,$$
$$y_9 = c_{17} s_5 + c_{18} s_6,$$
$$y_{13} = c_{25} s_7 + c_{26} s_8,$$
$$y_2 = c_3 s_3 + c_4 s_4,$$
$$y_6 = c_{11} s_5 + c_{12} s_6,$$
$$y_{10} = c_{19} s_7 + c_{20} s_8,$$
$$y_{14} = c_{27} s_1 + c_{28} s_2,$$
$$y_3 = c_5 s_5 + c_6 s_6,$$
$$y_7 = c_{13} s_7 + c_{14} s_8,$$
$$y_{11} = c_{21} s_1 + c_{22} s_2,$$
$$y_{15} = c_{29} s_3 + c_{30} s_4,$$

-continued $$y_4 = c_7 s_7 + c_8 s_8,$$

$$y_8 = c_{15} s_1 + c_{16} s_2,$$

$$y_{12} = c_{23} s_3 + c_{24} s_4,$$

$$y_{16} = c_{31} s_5 + c_{32} s_6.$$

$$\begin{pmatrix} y_1 \\ y_2 \\ y_3 \\ y_4 \\ y_5 \\ y_6 \\ y_7 \\ y_8 \\ y_9 \\ y_{10} \\ y_{11} \\ y_{12} \\ y_{13} \\ y_{14} \\ y_{15} \\ y_{16} \end{pmatrix} = \begin{pmatrix} c_1 & c_2 & 0 & 0 & 0 & 0 & 0 & 0 \\ 0 & 0 & c_3 & c_4 & 0 & 0 & 0 & 0 \\ 0 & 0 & 0 & 0 & c_5 & c_6 & 0 & 0 \\ 0 & 0 & 0 & 0 & 0 & 0 & c_7 & c_8 \\ 0 & 0 & c_9 & c_{10} & 0 & 0 & 0 & 0 \\ 0 & 0 & 0 & 0 & c_{11} & c_{12} & 0 & 0 \\ 0 & 0 & 0 & 0 & 0 & 0 & c_{13} & c_{14} \\ c_{15} & c_{16} & 0 & 0 & 0 & 0 & 0 & 0 \\ 0 & 0 & 0 & 0 & c_{17} & c_{18} & 0 & 0 \\ 0 & 0 & 0 & 0 & 0 & 0 & c_{19} & c_{20} \\ c_{21} & c_{22} & 0 & 0 & 0 & 0 & 0 & 0 \\ 0 & 0 & c_{23} & c_{24} & 0 & 0 & 0 & 0 \\ 0 & 0 & 0 & 0 & 0 & 0 & c_{25} & c_{26} \\ c_{27} & c_{28} & 0 & 0 & 0 & 0 & 0 & 0 \\ 0 & 0 & c_{29} & c_{30} & 0 & 0 & 0 & 0 \\ 0 & 0 & 0 & 0 & c_{31} & c_{32} & 0 & 0 \end{pmatrix} \cdot \begin{pmatrix} s_1 \\ s_2 \\ s_3 \\ s_4 \\ s_5 \\ s_6 \\ s_7 \\ s_8 \end{pmatrix}$$

A code matrix of [Math Figure 12] may be variously formatted depending on a combination of data symbols for the corresponding antenna, and a space-time code may be represented as a codeword matrix C defined by [Math Figure 13]. FIG. 6 shows a MIMO system that uses such a codeword matrix.

$$C = \begin{pmatrix} y_1 & y_5 & y_9 & y_{13} \\ y_2 & y_6 & y_{10} & y_{14} \\ y_3 & y_7 & y_{11} & y_{15} \\ y_4 & y_8 & y_{12} & y_{16} \end{pmatrix}$$ [Math Figure 13]

$$= \begin{pmatrix} c_1 s_1 + c_2 s_2 & c_9 s_3 + c_{10} s_4 & c_{17} s_5 + c_{18} s_6 & c_{25} s_7 + c_{26} s_8 \\ c_3 s_3 + c_4 s_4 & c_{11} s_5 + c_{12} s_6 & c_{19} s_7 + c_{20} s_8 & c_{27} s_1 + c_{28} s_2 \\ c_5 s_5 + c_6 s_6 & c_{13} s_7 + c_{14} s_8 & c_{21} s_1 + c_{22} s_2 & c_{29} s_3 + c_{30} s_4 \\ c_7 s_7 + c_8 s_8 & c_{15} s_1 + c_{16} s_2 & c_{23} s_3 + c_{24} s_4 & c_{31} s_5 + c_{32} s_6 \end{pmatrix}$$

One of design criteria for determining a combining coefficient $c_{i,j}$ to generate a space-time code is to maintain an average transmit power of a signal transmitted from each transmit antenna at every time slot to be equal, according to an embodiment of the present invention.

$$|c_{1,1}|^2 + |c_{1,2}|^2 + \ldots + |c_{1,N_t \cdot r}|^2 = P^1/N_t$$ [Math Figure 14]

$$|c_{2,1}|^2 + |c_{2,2}|^2 + \ldots + |c_{2,N_t \cdot r}|^2 = P^1/N_t$$

$$\vdots$$

$$|c_{N_t,1}|^2 + |c_{N_t,2}|^2 + \ldots + |c_{N_t,N_t \cdot r}|^2 = P^1/N_t$$

$$|c_{N_t+1,1}|^2 + |c_{N_t+1,2}|^2 + \ldots + |c_{N_t+1,N_t \cdot r}|^2 = P^2/N_t$$

$$\vdots$$

$$|c_{N_t \cdot N_t,1}|^2 + |c_{N_t \cdot N_t,2}|^2 + \ldots + |c_{N_t \cdot N_t,N_t \cdot r}|^2 = P^{N_t}/N_t$$

In [Math Figure 14], $P^t$ (t=1, 2, ..., T(=$N_t$)) denotes a transmit power allocated to a t-th time slot within a code block period. T is the number of time slots in a code block period.

Second one of design criteria is to maintain an average transmit power of all transmit signals at every time slot to be equal, as given in [Math Figure 15].

$$P^1 = P^2 = \ldots = P^T.$$ [Math Figure 15]

where P denotes a total signal power transmitted through all transmit antennas at one slot time.

Third one is to maintain total average transmit powers allocated to the respective data symbols during a code block period to be equal since one data symbol is transmitted over several time slots in the code block period. This may be defined by [Math Figure 16].

$$|c_{1,1}|^2 + |c_{2,1}|^2 + \ldots + |c_{N_t \cdot N_t,1}|^2 = P$$ [Math Figure 16]

$$|c_{1,2}|^2 + |c_{2,2}|^2 + \ldots + |c_{N_t \cdot N_t,2}|^2 = P$$

$$\vdots$$

$$|c_{1,N_t \cdot R}|^2 + |c_{2,N_t \cdot R}|^2 + \ldots + |c_{N_t \cdot N_t,N_t \cdot r}|^2 = P$$

In [Math Figure 16], P is a value obtained by dividing a total average transmit power ($P_{total-block}$) transmitted over T time slots during one code block period by T. In other words, $P = P_{total-block}/T$.

In the following examples, the average transmit power design criteria as shown in [Math Figure 14] to [Math Figure 16] are applied to the above-mentioned five codeword examples corresponding to the number of transmit antennas and the spatial multiplexing rate, where the combining coefficients can be determined optimally.

In a like manner of the first codeword example, if $N_t=2$ and r=2, a combining coefficient $C_k$ (K=1, ..., 8) may be determined by [Math Figure 17] and [Math Figure 18] when [Math Figure 14] is applied to maintain the average transmit power of each signal transmitted through the corresponding transmit antenna to be equal at every time slot, and [Math Figure 16] is applied to maintain a total average transmit powers allocated to the respective data symbols to be equal during one code block period.

$$|c_1|^2 + |c_2|^2 = \frac{P}{2}$$ [Math Figure 17]

$$|c_3|^2 + |c_4|^2 = \frac{P}{2}$$

$$|c_5|^2 + |c_6|^2 = \frac{P}{2}$$

$$|c_7|^2 + |c_8|^2 = \frac{P}{2}$$

$$|c_1|^2 + |c_2|^2 + |c_7|^2 + |c_8|^2 = P$$

$$|c_3|^2 + |c_4|^2 + |c_5|^2 + |c_6|^2 = P$$ [Math Figure 18]

If $N_t=3$ and r=1 in a like manner of the second codeword example, a combining coefficient $C_k$ (k=1, ..., 9) may be determined by [Math Figure 19] and [Math Figure 20] when [Math Figure 15] is applied to maintain the total average transmit power to be equal at every time slot, and [Math Figure 16] is applied to maintain the total average transmit powers allocated to the respective data symbols to be equal during one code block period.

$$|c_1|^2+|c_2|^2+|c_3|^2=P$$

$$|c_4|^2+|c_5|^2+|c_6|^2=P$$

$$|c_7|^2+|c_8|^2+|c_9|^2=P \qquad \text{[Math Figure 19]}$$

$$|c_1|^2+|c_6|^2+|c_8|^2=P$$

$$|c_2|^2+|c_4|^2+|c_9|^2=P$$

$$|c_3|^2+|c_5|^2+|c_7|^2=P \qquad \text{[Math Figure 20]}$$

Similar to the third example, if $N_t=3$ and $r=2$, a combining coefficient $C_k$ (K=1, ..., 18) may by determined by [Math Figure 21] and [Math Figure 22] when [Math Figure 14] is applied to maintain the average transmit power of a signal transmitted through the corresponding transmit antenna at every time slot, and [Math Figure 16] is applied to maintain the total average transmit powers allocated to the respective data symbols to be equal during one code block period.

$$|c_1|^2 + |c_2|^2 = \frac{P}{3} \qquad \text{[Math Figure 21]}$$

$$|c_3|^2 + |c_4|^2 = \frac{P}{3}$$

$$|c_5|^2 + |c_6|^2 = \frac{P}{3}$$

$$|c_7|^2 + |c_8|^2 = \frac{P}{3}$$

$$|c_9|^2 + |c_{10}|^2 = \frac{P}{3}$$

$$|c_{11}|^2 + |c_{12}|^2 = \frac{P}{3}$$

$$|c_{13}|^2 + |c_{14}|^2 = \frac{P}{3}$$

$$|c_{15}|^2 + |c_{16}|^2 = \frac{P}{3}$$

$$|c_{17}|^2 + |c_{18}|^2 = \frac{P}{3}$$

$$|c_1|^2 + |c_{11}|^2 + |c_{15}|^2 = \frac{P}{2} \qquad \text{[Math Figure 22]}$$

$$|c_2|^2 + |c_{12}|^2 + |c_{16}|^2 = \frac{P}{2}$$

$$|c_3|^2 + |c_7|^2 + |c_{17}|^2 = \frac{P}{2}$$

$$|c_4|^2 + |c_8|^2 + |c_{18}|^2 = \frac{P}{2}$$

$$|c_5|^2 + |c_9|^2 + |c_{13}|^2 = \frac{P}{2}$$

$$|c_6|^2 + |c_{10}|^2 + |c_{14}|^2 = \frac{P}{2}$$

Similar to the fourth example, if $N_t=4$ and $r=1$, a combining coefficient $C_k$ (K=1, ..., 16) may by determined by [Math Figure 23] and [Math Figure 24] when [Math Figure 15] is applied to maintain an total average transmit power at every time slot to be equal, and [Math Figure 16] is applied to maintain the total average transmit powers allocated to the respective data symbols to be equal during one code block period.

$$|c_1|^2+|c_2|^2+|c_3|^2+|c_4|^2=P$$

$$|c_5|^2+|c_6|^2+|c_7|^2+|c_8|^2=P$$

$$|c_9|^2+|c_{10}|^2+|c_{11}|^2+|c_{12}|^2=P$$

$$|c_{13}|^2+|c_{14}|^2+|c_{15}|^2+|c_{16}|^2=P \qquad \text{[Math Figure 23]}$$

$$|c_1|^2+|c_8|^2+|c_{11}|^2+|c_{14}|^2=P$$

$$|c_2|^2+|c_5|^2+|c_{12}|^2+|c_{15}|^2=P$$

$$|c_3|^2+|c_6|^2+|c_9|^2+|c_{16}|^2=P$$

$$|c_4|^2+|c_7|^2+|c_{10}|^2+|c_{13}|^2=P \qquad \text{[Math Figure 24]}$$

Similar to the fifth example, if $N_t=4$ and $r=2$, a combining coefficient $C_k$ (K=1, ..., 32) may by determined by [Math Figure 25], [Math Figure 26], and [Math Figure 27] when [Math Figure 14] is applied to maintain the average transmit power of a signal transmitted through the corresponding transmit antenna at every time slot to be equal, [Math Figure 15] is applied to maintain the total average transmit power at every time slot to be equal, and [Math Figure 16] is applied to maintain the total average transmit powers allocated to the respective data symbols to be equal during one code block period.

$$|c_1|^2 + |c_2|^2 = \frac{P}{4} \qquad \text{[Math Figure 25]}$$

$$|c_3|^2 + |c_4|^2 = \frac{P}{4}$$

$$|c_5|^2 + |c_6|^2 = \frac{P}{4}$$

$$|c_7|^2 + |c_8|^2 = \frac{P}{4}$$

$$|c_9|^2 + |c_{10}|^2 = \frac{P}{4}$$

$$|c_{11}|^2 + |c_{12}|^2 = \frac{P}{4}$$

$$|c_{13}|^2 + |c_{14}|^2 = \frac{P}{4}$$

$$|c_{15}|^2 + |c_{16}|^2 = \frac{P}{4}$$

$$|c_{17}|^2 + |c_{18}|^2 = \frac{P}{4}$$

$$|c_{19}|^2 + |c_{20}|^2 = \frac{P}{4}$$

$$|c_{21}|^2 + |c_{22}|^2 = \frac{P}{4}$$

$$|c_{23}|^2 + |c_{24}|^2 = \frac{P}{4}$$

$$|c_{25}|^2 + |c_{26}|^2 = \frac{P}{4}$$

$$|c_{27}|^2 + |c_{28}|^2 = \frac{P}{4}$$

$$|c_{29}|^2 + |c_{30}|^2 = \frac{P}{4}$$

$$|c_{31}|^2 + |c_{32}|^2 = \frac{P}{4}$$

$$|c_1|^2+|c_2|^2+|c_3|^2+|c_4|^2+|c_5|^2+|c_6|^2+|c_7|^2+|c_8|^2=P$$

$$|c_9|^2+|c_{10}|^2+|c_{11}|^2+|c_{12}|^2+|c_{13}|^2+|c_{14}|^2+|c_{15}|^2+|c_{16}|^2=P$$

$$|c_{17}|^2+|c_{18}|^2+|c_{19}|^2+|c_{20}|^2+|c_{21}|^2+|c_{22}|^2+|c_{23}|^2+|c_{24}|^2=P$$

$$|c_{25}|^2+|c_{26}|^2+|c_{27}|^2+|c_{27}|^2+|c_{28}|^2+|c_{29}|^2+|c_{30}|^2+|c_{31}|^2+|c_{32}|^2=P \quad \text{[Math Figure 26]}$$

$$|c_1|^2 + |c_{15}|^2 + |c_{21}|^2 + |c_{27}|^2 = \frac{P}{2} \quad \text{[Math Figure 27]}$$

$$|c_2|^2 + |c_{16}|^2 + |c_{22}|^2 + |c_{28}|^2 = \frac{P}{2}$$

$$|c_3|^2 + |c_9|^2 + |c_{23}|^2 + |c_{29}|^2 = \frac{P}{2}$$

$$|c_4|^2 + |c_{10}|^2 + |c_{24}|^2 + |c_{30}|^2 = \frac{P}{2}$$

$$|c_5|^2 + |c_{11}|^2 + |c_{17}|^2 + |c_{31}|^2 = \frac{P}{2}$$

$$|c_6|^2 + |c_{12}|^2 + |c_{18}|^2 + |c_{32}|^2 = \frac{P}{2}$$

$$|c_7|^2 + |c_{13}|^2 + |c_{19}|^2 + |c_{25}|^2 = \frac{P}{2}$$

$$|c_8|^2 + |c_{14}|^2 + |c_{20}|^2 + |c_{26}|^2 = \frac{P}{2}$$

where P represents a transmit power allocated at every time slot in the above five codeword examples.

The combining coefficients corresponding to the foregoing five codeword examples according to the number of transmit antennas and the spatial multiplexing rate are first determined, and such the combining coefficients are represented by using complex numbers. The representation of the combining coefficients will now be described in conjunction with the above five codeword examples.

Similar to the first example, if $N_t=2$ and $r=2$, combining coefficients $\{C_i\}$ (i=1, ..., 8) are represented by using $r_1$, $r_2$, $\theta_1$, $\theta_2$, $\theta_3$, $\theta_4$, $\theta_5$, $\theta_6$, $\theta_7$, and $\theta_8$ as shown in [Math Figure 28] ($r_1$ and $r_2$ are real numbers greater than zero, and $\theta_1$, $\theta_2$, $\theta_3$, $\theta_4$, $\theta_5$, $\theta_6$, $\theta_7$, and $\theta_8$ are respectively defined between 0 and $2\pi$).

$$c_1 = \frac{1}{\sqrt{2(1+r_1^2)}} e^{j\theta_1} \quad \text{[Math Figure 28]}$$

$$c_2 = \frac{r_1}{\sqrt{2(1+r_1^2)}} e^{j\theta_2}$$

$$c_3 = \frac{1}{\sqrt{2(1+r_2^2)}} e^{j\theta_3}$$

$$c_4 = \frac{r_2}{\sqrt{2(1+r_2^2)}} e^{j\theta_4}$$

$$c_5 = \frac{r_2}{\sqrt{2(1+r_2^2)}} e^{j\theta_5}$$

$$c_6 = \frac{1}{\sqrt{2(1+r_2^2)}} e^{j\theta_6}$$

$$c_7 = \frac{r_1}{\sqrt{2(1+r_1^2)}} e^{j\theta_7}$$

$$c_8 = \frac{1}{\sqrt{2(1+r_1^2)}} e^{j\theta_8}$$

Similar to the second example, if $N_t=3$ and $r=1$, combining coefficients $\{C_j\}$ (j=1, ..., 9) are represented by using $\theta_1$, $\theta_2$, $\theta_3$, $\theta_4$, $\theta_5$, $\theta_6$, $\theta_7$, $\theta_8$, and $\theta_9$ as shown in [Math Figure 29] ($\theta_9$ is defined to be between 0 and $2\pi$).

$$c_1 = \frac{1}{\sqrt{3}} e^{j\theta_1} \quad \text{[Math Figure 29]}$$

$$c_2 = \frac{1}{\sqrt{3}} e^{j\theta_2}$$

$$c_3 = \frac{1}{\sqrt{3}} e^{j\theta_3}$$

$$c_4 = \frac{1}{\sqrt{3}} e^{j\theta_4}$$

$$c_5 = \frac{1}{\sqrt{3}} e^{j\theta_5}$$

$$c_6 = \frac{1}{\sqrt{3}} e^{j\theta_6}$$

$$c_7 = \frac{1}{\sqrt{3}} e^{j\theta_7}$$

$$c_8 = \frac{1}{\sqrt{3}} e^{j\theta_8}$$

$$c_9 = \frac{1}{\sqrt{3}} e^{j\theta_9}$$

Similar to the fourth example, if $N_t=4$ and $r=1$, combining coefficients $\{C_k\}$ (k=1, ..., 16) is represented by using $\theta_1$, $\theta_2$, $\theta_3$, ..., and $\theta_{16}$ as shown in [Math Figure 30] ($\theta_{10}$ to $\theta_{16}$ are defined to be between 0 and $2\pi$).

$$c_1 = \frac{1}{\sqrt{4}} e^{j\theta_1} \quad \text{[Math Figure 30]}$$

$$c_2 = \frac{1}{\sqrt{4}} e^{j\theta_2}$$

$$c_3 = \frac{1}{\sqrt{4}} e^{j\theta_3}$$

$$c_4 = \frac{1}{\sqrt{4}} e^{j\theta_4}$$

$$c_5 = \frac{1}{\sqrt{4}} e^{j\theta_5}$$

$$c_6 = \frac{1}{\sqrt{4}} e^{j\theta_6}$$

$$c_7 = \frac{1}{\sqrt{4}} e^{j\theta_7}$$

$$c_8 = \frac{1}{\sqrt{4}} e^{j\theta_8}$$

$$c_9 = \frac{1}{\sqrt{4}} e^{j\theta_9}$$

$$c_{10} = \frac{1}{\sqrt{4}} e^{j\theta_{10}}$$

$$c_{11} = \frac{1}{\sqrt{4}} e^{j\theta_{11}}$$

$$c_{12} = \frac{1}{\sqrt{4}} e^{j\theta_{12}}$$

$$c_{13} = \frac{1}{\sqrt{4}} e^{j\theta_{13}}$$

$$c_{14} = \frac{1}{\sqrt{4}} e^{j\theta_{14}}$$

-continued $$c_{15} = \frac{1}{\sqrt{4}} e^{j\theta_{15}}$$

$$c_{16} = \frac{1}{\sqrt{4}} e^{j\theta_{16}}$$

Similar to the fifth example, if $N_t=4$ and $r=2$, combining coefficients $\{C_k\}$ (k=1, . . . , 32) is represented by using $r_1$, $r_2$, $r_3$,
$\theta_b$, $\theta_d$, $\theta_f$,
$\theta_b$, $\theta_d$, $\theta_f$, $\theta_h$, $\theta_i$, $\theta_j$, $\theta_k$, $\theta_l$, $\theta_m$, $\theta_n$, $\theta_o$, $\theta_p$, $\theta_q$, $\theta_r$, $\theta_s$, $\theta_t$, $\theta_u$, $\theta_v$, $\theta_w$, $\theta_x$, $\theta_y$, $\theta_\alpha$, $\theta_\gamma$, and
$\theta_\epsilon$ (here, $r_3$ is a real number greater than zero, and
$\theta_b$, $\theta_d$, $\theta_f$,
$\theta_b$, $\theta_d$, $\theta_f$, $\theta_h$, $\theta_i$, $\theta_j$, $\theta_k$, $\theta_l$, $\theta_m$, $\theta_n$, $\theta_o$, $\theta_p$, $\theta_q$, $\theta_r$, $\theta_s$, $\theta_t$, $\theta_u$, $\theta_v$, $\theta_w$, $\theta_x$, $\theta_y$, $\theta_\alpha$, $\theta_\gamma$, and
$\theta_\epsilon$ are defined to be between 0 and $2\pi$).

[Math Figure 31]

$$c_1 = \pm \frac{1}{\sqrt{4(1+r_3^2)}}$$

$$c_{15} = r_1 c_1 \cdot e^{j\theta_o}$$

$$c_{21} = r_2 c_1 \cdot e^{j\theta_u}$$

$$c_{27} = r_3 c_1 \cdot e^{j\theta_u}$$

$$c_2 = r_3 c_1 \cdot e^{j\theta_b}$$

$$c_{16} = r_2 c_1 \cdot e^{j\theta_p}$$

$$c_{22} = r_1 c_1 \cdot e^{j\theta_v}$$

$$c_{28} = \pm \frac{1}{\sqrt{4(1+r_3^2)}}$$

$$c_3 = \pm \frac{1}{\sqrt{4(1+r_3^2)}}$$

$$c_9 = r_1 c_3 \cdot e^{j\theta_i}$$

$$c_{23} = r_2 c_3 \cdot e^{j\theta_w}$$

$$c_{29} = r_3 c_3 \cdot e^{j\theta_r}$$

$$c_4 = r_3 c_3 \cdot e^{j\theta_d}$$

$$c_{10} = r_2 c_3 \cdot e^{j\theta_j}$$

$$c_{24} = r_1 c_3 \cdot e^{jx}$$

$$c_{30} = \pm \frac{1}{\sqrt{4(1+r_3^2)}}$$

$$c_5 = \pm \frac{1}{\sqrt{4(1+r_3^2)}}$$

$$c_{11} = r_1 c_5 \cdot e^{j\theta_k}$$

$$c_{17} = r_2 c_5 \cdot e^{j\theta_a}$$

$$c_{31} = r_3 c_5 \cdot e^{j\theta_c}$$

$$c_6 = r_3 c_5 \cdot e^{j\theta_f}$$

$$c_{12} = r_2 c_5 \cdot e^{j\theta_l}$$

$$c_{18} = r_1 c_5 \cdot e^{jr}$$

$$c_{32} = \pm \frac{1}{\sqrt{4(1+r_3^2)}}$$

$$c_7 = \pm \frac{1}{\sqrt{4(1+r_3^2)}}$$

-continued $$c_{13} = r_1 c_7 \cdot e^{j\theta_m}$$

$$c_{19} = r_2 c_7 \cdot e^{j\theta_s}$$

$$c_{25} = r_3 c_7 \cdot e^{j\theta_y}$$

$$c_8 = r_3 c_7 \cdot e^{j\theta_h}$$

$$c_{14} = r_2 c_7 \cdot e^{j\theta_r}$$

$$c_{20} = r_1 c_7 \cdot e^{jt}$$

$$c_{26} = \pm \frac{1}{\sqrt{4(1+r_3^2)}}$$

A complex weight $C_{i,j}$ that is a combining coefficient for the full diversity gain and the full spatial multiplexing gain according to an embodiment of the present invention is obtained by determining a weight Ci,j that maximizes a minimum determinant of a space-time codeword matrix difference of [Math Figure 1] or [Math Figure 13] while satisfying criteria of [Math Figure 14], [Math Figure 15], and [Math Figure 16], or maximizes an average determinant of difference matrix of the space-time codeword matrix. The following [Math Figure 32] is designed to maximize a minimum determinant, and [Math Figure 33] is designed to maximize an average determinant.

$$\max_{C_1 \neq C_2} \min |\det(C_1 - C_2)|^2 \qquad \text{[Math Figure 32]}$$

$$\max_{C_1 \neq C_2} avg |\det(C_1 - C_2)|^2 \qquad \text{[Math Figure 33]}$$

If [Math Figure 32] is applied to the example of determining the combining coefficients by using $r_1$ and $r_2$ when $N_t=2$ and $r=2$ as shown in [Math Figure 28], $r_1$ and $r_2$ may be defined by [Math Figure 34].

$$r_1 = \frac{1+\sqrt{5}}{2} \text{ or } \frac{-1+\sqrt{5}}{2} \qquad \text{[Math Figure 34]}$$

$$r_2 = \frac{1+\sqrt{5}}{2} \text{ or } \frac{-1+\sqrt{5}}{2}$$

In addition, if [Math Figure 32] is applied to the example of determining the combining coefficients by using $\theta_1$, $\theta_2$, $\theta_3$, $\theta_4$, $\theta_5$, $\theta_5$, $\theta_6$, $\theta_7$, and $\theta_8$, values of $\theta_1$, $\theta_2$, $\theta_3$, $\theta_4$, $\theta_5$, $\theta_6$, $\theta_7$, and $\theta_8$ may be defined by [Math Figure 35].

$$\theta_1 + \theta_8 = \theta_2 + \theta_7 + \pi, \qquad \text{[Math Figure 35]}$$

$$\theta_3 + \theta_6 = \theta_4 + \theta_5 + \pi,$$

$$\theta_4 + \theta_5 =$$

$$\theta_2 + \theta_7 + \frac{\pi}{2} \text{ or } \theta_4 + \theta_5 = \theta_2 + \theta_7 - \frac{\pi}{2}$$

If [Math Figure 32] is applied to the example of determining the combining coefficients by using $\theta_1$, $\theta_2$, $\theta_3$, $\theta_4$, $\theta_5$, $\theta_6$, $\theta_7$, $\theta_8$ and $\theta_9$ when $N_t=3$ and $r=1$ as shown in [Math Figure 29], values of $\theta_1$, $\theta_2$, $\theta_3$, $\theta_4$, $\theta_5$, $\theta_6$, $\theta_7$, $\theta_8$, and $\theta_9$ may be defined by [Math Figure 36].

$$\theta_1 + \theta_5 + \theta_9 =$$ [Math Figure 36]

$$\theta_3 + \theta_4 + \theta_8 + \frac{\pi}{2} = \theta_2 + \theta_6 + \theta_7 + \pi,$$

$$\theta_1 + \theta_6 + \theta_8 = 0,$$

$$\theta_2 + \theta_4 + \theta_9 = \frac{\pi}{8},$$

$$\theta_3 + \theta_5 + \theta_7 = \frac{\pi}{4}$$

The space-time code according to the foregoing embodiment may be applied to various modulation systems such as Quadrature Phase Shift Keying (QPSK), 16 Quadrature Amplitude Modulation (QAM), and 64 QAM. In addition, a bit error rate (BER) of a space-time code in an uncoded state is comparatively lower than a conventional matrix B system and the FDFR system as shown in FIG. 7, and BER performance in a coded state is enhanced compared to the conventional matrix B system.

According to the present invention, the MIMO system that uses multiple transmit antennas effectively responds to channel variation since the MIMO system uses a space-time code designed to simultaneously obtain a full diversity gain and a full spatial multiplexing gain with a minimum delay. In addition, a signal is generated from combinations of data symbols of each antenna at every time slot, and therefore the Euclidean distance of the data symbols increases, resulting in a high encoding gain.

In addition, the space-time code may be applied to various MIMO systems since the number of transmit/receive antennas and the spatial multiplexing rate are regularly defined, and thus a structure of the space-time code may be easily modified depending on a channel condition. Further, the space-time code may be designed to obtain the full diversity and the coding gains when the spatial multiplexing rate is determined, and thus capacity of the MIMO system may be used fully.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A system having multiple transmit antennas, comprising:
a transmitter configured to transmit a plurality of data symbols to a receiver according to a space-time code including a code word matrix,
wherein the transmitter is configured to transmit an amount of data symbols corresponding to a product of the number of transmit antennas and a spatial multiplexing rate during one code block period, a row index of the code word matrix indicating combined signals transmitted through different transmit antennas and a column index of the code word matrix indicating time slots; and
wherein the average number of data symbols allocated to each transmit antenna at every time slot is equal to the spatial multiplexing rate, the data symbols allocated to each transmit antenna at every time slot are combined together using a set of combining coefficients and transmitted through the corresponding transmit antenna, and each transmit antenna transmits a different set of data symbols from a time slot to another, the set of combining coefficients that combines the data symbols allocated to each transmit antenna to be different for each time slot.

2. The system of claim 1, wherein when the average number of data symbols that corresponds to the spatial multiplexing rate is allocated to each transmit antenna at every time slot of the code word matrix, the same number of data symbols is allocated to each transmit antenna for transmission.

3. The system of claim 1, wherein when the average number of data symbols that corresponds to the spatial multiplexing rate is allocated to each transmit antenna at every time slot of the code word matrix, a different number of data symbols is allocated to each transmit antenna for transmission.

4. The system of claim 1, wherein when the average number of data symbols that corresponds to the spatial multiplexing rate is allocated to each transmit antenna at every time slot of the code word matrix, a portion of the data symbols is duplicated to each transmit antenna in a code block period.

5. The system of claim 1, wherein when the average number of data symbols that corresponds to the spatial multiplexing rate is allocated to each transmit antenna at every time slot of the code word matrix, different sets of data symbols are allocated to the respective transmit antennas for transmission.

6. The system of claim 1, wherein when the data symbols allocated to each transmit antenna are combined together and simultaneously transmitted through the corresponding transmit antenna, the data symbols allocated to each transmit antenna are combined together with a set of combining coefficients from a transmit antenna to another.

7. The system of claim 6, wherein the data symbols allocated to each transmit antenna are combined together using only real-number coefficients.

8. The system of claim 6, wherein the data symbols allocated to each transmit antenna are combined together using complex-number coefficients.

9. The system of claim 8, wherein when combining the data symbols using the complex-number coefficients at each transmit antenna, only complex numbers with all having the same magnitude are used to combine together the data symbols for each transmit antenna.

10. The system of claim 1, wherein when each transmit antenna transmits a different set of data symbols from a time slot to another, the number of data symbols transmitted through the corresponding transmit antenna is set to be equal from a time slot to another.

11. The system of claim 1, wherein when each transmit antenna transmits a different set of data symbols from a time slot to another, the number of data symbols transmitted in a time slot is set to be equal from a time slot to another.

12. The system of claim 1, wherein when each transmit antenna transmits a different set of data symbols from a time slot to another, the number of data symbols to be transmitted in a time slot is set to be different from a time slot to another.

13. The system of claim 1, wherein when setting a code word matrix to transmit a plurality of data symbols that corresponds to a product of the number of transmit antennas and the spatial multiplexing rate during one code block period, every data symbols to be transmitted in the code block is allocated at least once to all transmit antennas during one code block period.

14. A system, comprising:
a transmitter having multiple transmit antennas; and
a receiver having multiple receive antennas and configured to decode a plurality of input data input through the multiple receive antennas of the receiver according to a decoding rule based on a space-time code,
wherein the space-time code comprises a square code word matrix for transmitting an amount of data symbols corresponding to a product of the number of transmit antennas and a spatial multiplexing rate during one code block period, a row index of the code word matrix indicating combined signals transmitted through different transmit antennas and a column index of the code word matrix indicating time slots; and wherein the average number of data symbols allocated to each transmit antenna at every time slot is equal to the spatial multiplexing rate, the data symbols allocated to each transmit antenna at every time slot are combined together using a set of combining coefficients and simultaneously transmitted through the corresponding transmit antenna, and each transmit antenna transmits a different set of data symbols from a time slot to another, the set of combining coefficients that combines the data symbols allocated to each transmit antenna to be different for each time slot.

* * * * *

UNITED STATES PATENT AND TRADEMARK OFFICE
CERTIFICATE OF CORRECTION

PATENT NO. : 7,903,753 B2
APPLICATION NO. : 11/574725
DATED : March 8, 2011
INVENTOR(S) : Seung-Joon Lee et al.

Page 1 of 1

It is certified that error appears in the above-identified patent and that said Letters Patent is hereby corrected as shown below:

On the title page, item [73] add:

-- Ajou University Industry Cooperation Foundation of San 5, Woncheon-dong, Yeongtong-gu, Suwon-si, Gyconggi-do, 442-749, Republic of Korea --

Signed and Sealed this
Twenty-seventh Day of December, 2011

David J. Kappos
*Director of the United States Patent and Trademark Office*